US008180518B2

(12) United States Patent
Petricoin, Jr.

(10) Patent No.: US 8,180,518 B2
(45) Date of Patent: May 15, 2012

(54) SYSTEM AND METHOD FOR DETERMINING MICROENVIRONMENT CONDITIONS EXTERNAL TO A VEHICLE

(75) Inventor: Dennis M. Petricoin, Jr., Hemlock, NY (US)

(73) Assignee: Robert Bosch GmbH, Stuttgart (DE)

( * ) Notice: Subject to any disclaimer, the term of this patent is extended or adjusted under 35 U.S.C. 154(b) by 1062 days.

(21) Appl. No.: 12/103,481

(22) Filed: Apr. 15, 2008

(65) Prior Publication Data
US 2009/0259360 A1 Oct. 15, 2009

(51) Int. Cl.
G08G 1/048 (2006.01)
G01P 3/00 (2006.01)
G01C 21/00 (2006.01)

(52) U.S. Cl. ............... 701/30.6; 701/29.7; 701/30.3; 701/30.5; 701/32.3; 701/32.4; 701/34.3; 340/601; 340/602; 702/3; 702/130

(58) Field of Classification Search ............... 701/1, 29, 701/33, 36, 70, 117, 207, 30.6, 29.7, 30.3, 701/30.5, 32.3, 32.4, 34.3; 340/601, 602; 702/3, 130
See application file for complete search history.

(56) References Cited

U.S. PATENT DOCUMENTS

| 4,100,529 | A | | 7/1978 | Evans | |
|---|---|---|---|---|---|
| 5,699,056 | A | * | 12/1997 | Yoshida | 340/905 |
| 5,908,464 | A | * | 6/1999 | Kishigami et al. | 701/208 |
| 5,963,148 | A | * | 10/1999 | Sekine et al. | 340/905 |
| 6,012,012 | A | * | 1/2000 | Fleck et al. | 701/117 |
| 6,092,020 | A | | 7/2000 | Fastenrath et al. | |
| 6,150,961 | A | * | 11/2000 | Alewine et al. | 340/995.1 |
| 6,178,374 | B1 | | 1/2001 | Mohlenkamp et al. | |
| 6,222,462 | B1 | | 4/2001 | Hahn | |
| 6,236,933 | B1 | | 5/2001 | Lang | |
| 6,256,577 | B1 | * | 7/2001 | Graunke | 701/117 |
| 6,266,608 | B1 | * | 7/2001 | Pertz | 701/200 |
| 6,292,742 | B1 | * | 9/2001 | Heimann et al. | 701/117 |
| 6,317,682 | B1 | * | 11/2001 | Ogura et al. | 701/117 |
| 6,353,785 | B1 | * | 3/2002 | Shuman et al. | 701/48 |
| 6,401,027 | B1 | * | 6/2002 | Xu et al. | 701/117 |
| 6,459,365 | B2 | * | 10/2002 | Tamura | 340/425.5 |
| 6,487,500 | B2 | * | 11/2002 | Lemelson et al. | 701/301 |
| 6,525,656 | B1 | | 2/2003 | Hahn | |
| 6,535,141 | B1 | * | 3/2003 | Doherty | 340/905 |
| 6,577,946 | B2 | | 6/2003 | Myr | |
| 6,587,777 | B1 | | 7/2003 | St. Pierre | |
| 6,618,667 | B1 | * | 9/2003 | Berwanger et al. | 701/117 |
| 6,630,891 | B1 | | 10/2003 | Dilling | |

(Continued)

OTHER PUBLICATIONS

United States Patent and Trademark Office, Office Office Action dated Jul. 13, 2007 regarding U.S. Appl. No. 11/163,789, filed Oct. 31, 2005, 15 pages.

(Continued)

Primary Examiner — Darnell Jayne
Assistant Examiner — Sasha T Varghese
(74) Attorney, Agent, or Firm — Michael Best & Friedrich LLP (57) ABSTRACT

A system and a method for generating a microenvironment condition report. The microenvironment condition report is generated from information related to a plurality of vehicle conditions. The vehicle condition information is gathered from a plurality of in-vehicle technologies such as a stability control system, ABS, and navigation system. The vehicle condition information is sent to a remote terminal that organizes the information with respect to a set of microareas. The information for each microarea is analyzed and used to generate the microenvironment condition report.

22 Claims, 9 Drawing Sheets

U.S. PATENT DOCUMENTS

| | | | |
|---|---|---|---|
| 6,654,681 B1 * | 11/2003 | Schmidt et al. | 701/117 |
| 6,711,493 B1 * | 3/2004 | Andrews et al. | 701/117 |
| 6,765,495 B1 | 7/2004 | Dunning et al. | |
| 6,785,551 B1 * | 8/2004 | Richard | 455/456.1 |
| 6,798,354 B2 | 9/2004 | Schuessler | |
| 6,801,837 B2 * | 10/2004 | Carlstedt et al. | 701/1 |
| 6,807,473 B1 * | 10/2004 | Tran | 701/80 |
| 6,810,328 B2 * | 10/2004 | Yokota et al. | 701/210 |
| 6,845,324 B2 * | 1/2005 | Smith | 702/3 |
| 6,853,913 B2 * | 2/2005 | Cherveny et al. | 701/208 |
| 6,895,310 B1 * | 5/2005 | Kolls | 701/1 |
| 6,919,821 B1 * | 7/2005 | Smith | 340/905 |
| 7,047,130 B2 * | 5/2006 | Watanabe et al. | 701/209 |
| 7,089,116 B2 * | 8/2006 | Smith | 702/3 |
| 7,113,865 B2 * | 9/2006 | Ignatin | 701/200 |
| 7,164,365 B2 | 1/2007 | Doherty et al. | |
| 7,167,798 B2 * | 1/2007 | Kondoh et al. | 701/301 |
| 7,228,224 B1 | 6/2007 | Rosen et al. | |
| 2003/0060936 A1 * | 3/2003 | Yamamura et al. | 701/1 |
| 2004/0102898 A1 | 5/2004 | Yokota et al. | |
| 2005/0003844 A1 * | 1/2005 | Nishiga et al. | 455/517 |
| 2005/0065711 A1 * | 3/2005 | Dahlgren et al. | 701/117 |
| 2005/0099323 A1 * | 5/2005 | Hirose | 340/995.13 |
| 2005/0187714 A1 * | 8/2005 | Brulle-Drews | 702/3 |
| 2006/0261975 A1 * | 11/2006 | Fridthjof | 340/905 |
| 2007/0093958 A1 * | 4/2007 | Jonsson et al. | 701/211 |
| 2007/0096892 A1 | 5/2007 | Nathan et al. | |
| 2007/0188348 A1 * | 8/2007 | Bauer et al. | 340/905 |
| 2007/0208492 A1 * | 9/2007 | Downs et al. | 701/117 |
| 2007/0252723 A1 * | 11/2007 | Boss et al. | 340/902 |
| 2008/0189009 A1 * | 8/2008 | Wang et al. | 701/34 |

OTHER PUBLICATIONS

Roy Furchgott, Navigating With Feedback From Fellow Drivers, http://www.nytimes.com/2007/10/18/technology/circuits/18basics.html?ref=automobiles . . . dated Oct. 22, 2007, 4 pages.

* cited by examiner

SYSTEM AND METHOD FOR DETERMINING MICROENVIRONMENT CONDITIONS EXTERNAL TO A VEHICLE

BACKGROUND

The present invention relates to using in-vehicle systems to provide information regarding conditions external to a vehicle. More particularly, the invention relates to using in-vehicle systems to provide information regarding weather, traffic, and other conditions outside a vehicle.

Many new vehicles include technologies such as stability control, anti-lock brakes or anti-lock brake systems ("ABS"), and navigational systems. Such technologies assist a driver in, for example, controlling a vehicle (such as in an accident-avoidance maneuver or panic stop) and in arriving at a desired location (such as by providing voice-directions to the driver).

SUMMARY

Although numerous in-vehicle systems exist, they are not typically used to provide information to a driver about conditions outside of or external to a vehicle. In embodiments of the invention, information obtained from in-vehicle systems such as stability control, anti-lock braking, and navigation systems is combined in a set of vehicle condition information. The set of vehicle condition information is sent to a remote terminal that is configured to organize the information with respect to locations referred to as "microareas." The information related to each microarea is analyzed and used to generate a microenvironment condition report. The microenvironment condition report provides a detailed set of information related to weather conditions, traffic conditions, road conditions, traffic patterns, and the like. The microenvironment condition reports are then provided to one or more end users.

In one embodiment, the invention provides a system for determining a microenvironment condition report. The system includes a first plurality of monitoring devices (such as sensors in a vehicle (e.g., brake sensors, crash sensors, temperature sensors, rain sensors, etc.)), a first terminal (such as a computer or computers that process information from the sensors), a first communication device or system (such as a cellular-phone-network based, in-vehicle safety and security system (e.g., the OnStar system offered by General Motors)), a second plurality of monitoring devices (such as sensors in a second vehicle), a second terminal (such as a server), and a second communication device (such as a modem or network interface able to communicate over a telephone network, the Internet, or other networks). The first plurality of monitoring devices is located in a first vehicle and each monitoring device is configured to monitor at least one condition among a plurality of vehicle conditions of the first vehicle that include a vehicle location and a vehicle speed. The first terminal is coupled to the first vehicle and configured to collect a first set of condition information related to the conditions of the first vehicle. The first communication device is connected to the first terminal and is configured to transmit the first set of condition information through a wide area network. The second plurality of monitoring devices is located in a second vehicle. Each monitoring device is configured to monitor at least one condition among a plurality of vehicle conditions of the second vehicle. The second terminal is coupled to the wide area network and is configured to receive the first set of condition information and a second set of condition information. The second terminal is also configured to arrange the first set of condition information and the second set of condition information according to a set of microareas to create a set of microarea condition information. The second terminal evaluates a correlation function related to each condition in the set of microarea condition information to determine a first set of microenvironment conditions for a respective microarea. The second terminal analyzes the first set of microenvironment conditions, at least a second set of microenvironment conditions from a microarea adjacent to the first microarea, and a previous set of microenvironment conditions of the respective microarea to generate a first microenvironment condition report. The second communication device is coupled to the second terminal and is configured to pass the first microenvironment condition report to a plurality of users.

In another embodiment, the invention provides a method for determining a microenvironment condition report. The method includes monitoring a first set of conditions of a first vehicle that includes a vehicle location and a vehicle speed. A first terminal is coupled to the first vehicle. The first terminal is configured to collect a first set of condition information related to the first set of conditions. A first communication device is then connected to the first terminal. After the first communication device is connected, the first set of condition information is transmitted through a wide area network. The method also includes monitoring a second set of conditions of a second vehicle that includes a second vehicle location and a second vehicle speed. A second terminal is connected to the wide area network and is configured to receive the first set of condition information and a second set of condition information. Next, the first set of condition information and the second set of condition information are arranged based on a set of microareas to create a first set of microarea condition information. A correlation function related to each respective condition in the first set of microarea condition information is then evaluated. After each correlation function has been evaluated, a first set of microenvironment conditions is determined for a respective microarea based on at least the first and second sets of microarea condition information. The second terminal is also configured for analyzing the first set of microenvironment conditions for the respective microarea, at least a second set of microenvironment conditions from a microarea adjacent to the first microarea, and a previous set of microenvironment conditions of the respective microarea. The second terminal then generates a first microenvironment condition report. A second communication device is coupled to the second terminal and configured for passing the first microenvironment condition report to a plurality of users.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
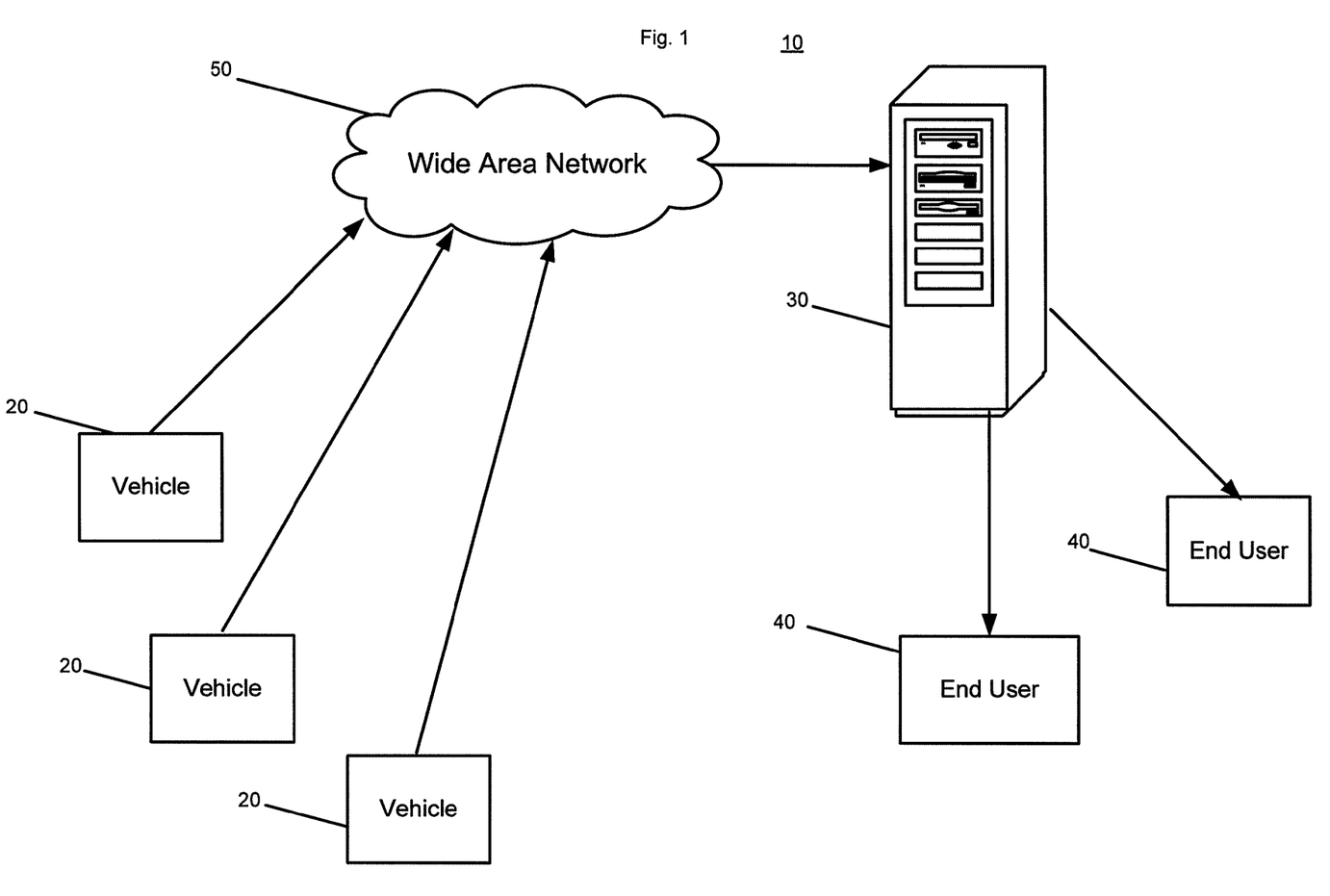
FIG. 1 illustrates an embodiment of a system for generating a microenvironment condition report.

FIG. 1 illustrates a system 10 for generating a microenvironment condition report. The system 10 includes a plurality of vehicles 20, a second terminal 30, one or more end users 40, and a wide area network 50, such as a cellular network or the Internet. Each vehicle 20 is configured to gather a set of condition information. The condition information gathered in the vehicles is sent through the wide area network 50 to the second terminal 30. The second terminal 30 is configured to collect data from the plurality of vehicles 20, arrange the data according to a set of microareas, analyze the data to generate a microenvironment condition report, and send the microenvironment condition report to the one or more end users.

Figure 2:
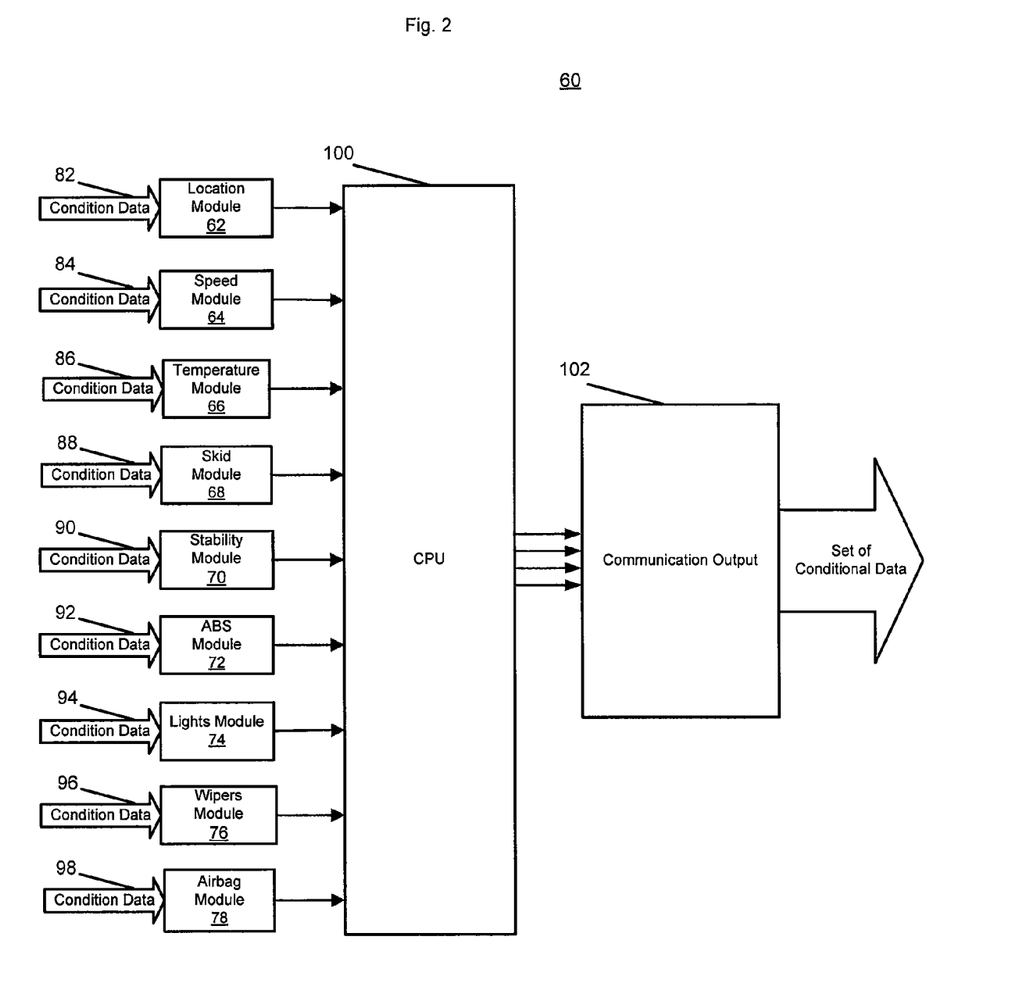
FIG. 2 illustrates an embodiment of a system for acquiring and transmitting a set of condition data.

FIG. 2 illustrates an embodiment of a first terminal 60 located in each vehicle 20. The first terminal 60 includes a plurality of condition modules 62-78, a central processing unit (CPU) 100, and a first communications device 102. Each of the condition modules 62-78 includes a monitoring device and gathers condition information to send to the CPU 100. The CPU 100 includes memory and is capable of executing computer instructions fetched from the memory. The CPU 100 also passes information to the first communication device 102. The first communication device 102 is configured to send information through the wide area network 50 using conventional transfer protocols. The second terminal 30 includes a second communication device configured to receive information sent from the first terminal 60 through the wide area network 50. The first terminal 60 and the second terminal 30 are described in more detail below.

As illustrated in FIG. 2, each of the plurality of vehicles 20, described above with respect to FIG. 1, includes a plurality of condition modules 62-78. Each of the condition modules 62-78 is associated with a respective monitoring device. For example, a location monitoring device is related to a location module 62 and a speed monitoring device is related to a speed module 64. Additional monitoring devices include a temperature-monitoring device, a skid control-monitoring device, a stability control monitoring device, an anti-lock braking system (ABS) monitoring device, a lights monitoring device, a wipers monitoring device, and an airbag monitoring device. Other embodiments include more or fewer monitoring devices.

Each of the condition modules 62-78 and respective monitoring devices acquire information related a respective condition 82-98. The condition information is collected in the CPU 100. In one embodiment, for example, the set of condition data for a temperature module 66 includes one or more temperature measurements of the area surrounding the vehicle 20. The set of condition information related to a lights module 74 includes information related to whether or not a vehicle's headlights, fog lights, dome lights, or turn signals are being used. Each of the condition modules is described in more detail below.

Figure 3:
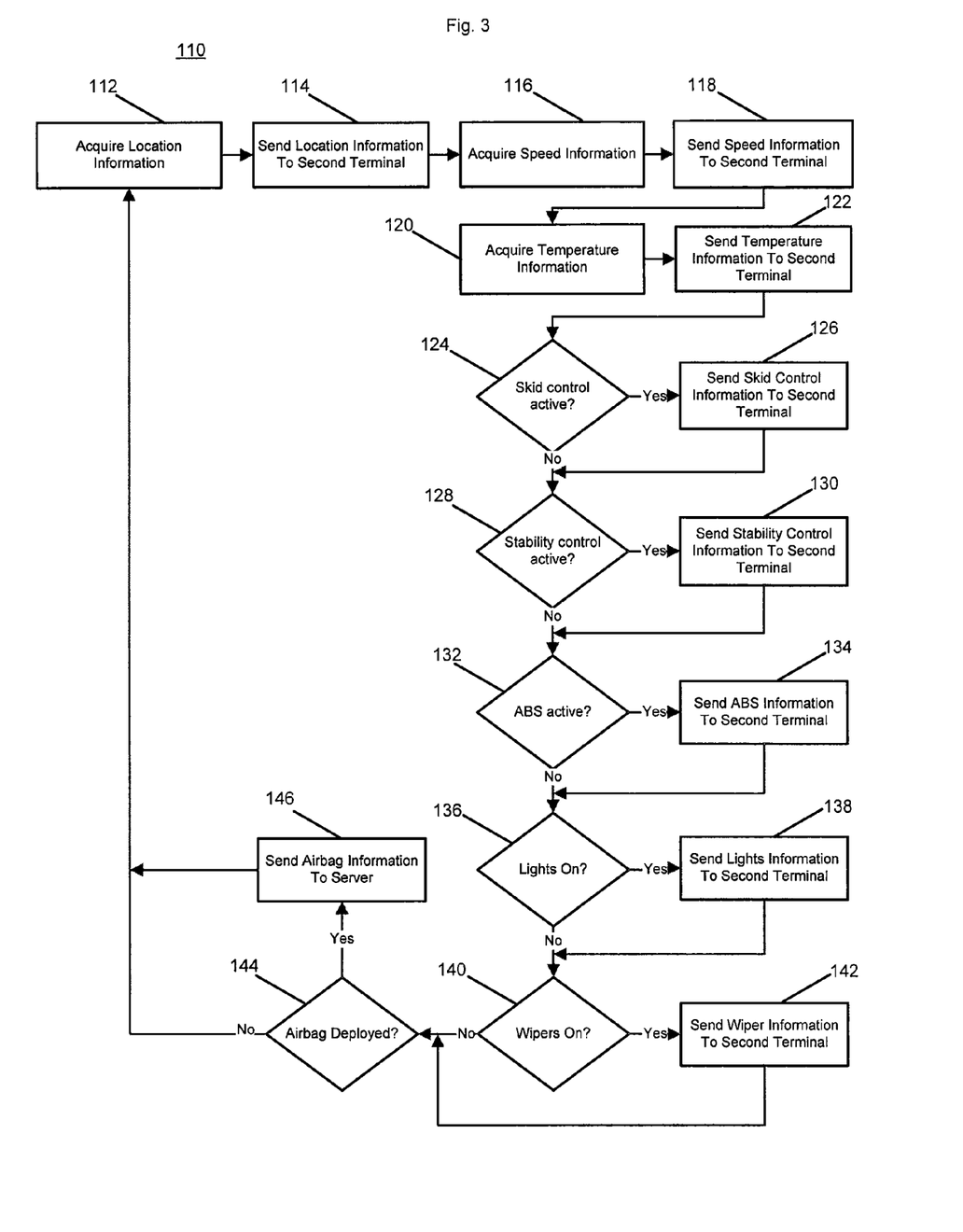
FIG. 3 illustrates an embodiment of a process for acquiring and transmitting a set of condition data.

FIG. 3 illustrates an embodiment of a process 110 in which condition information from each condition module 62-78 is sent individually to the second terminal 30. First, location data is acquired (step 112). Location data is acquired via a number of techniques. For example, global positional systems, which are common in many vehicles, use three or more satellites to determine the location of a vehicle. In other embodiments of the invention, additional techniques for determining the location of a vehicle are used, such as, among others things, a LoJack system, a long-range navigation (LO-RAN) system, and global system for mobile communications (GSM) localization. The location data is then sent to the second terminal (step 114).

After step 114, speed information is acquired (step 116) and sent to the second terminal (step 118). In one embodiment, speed information also includes information related to the direction the vehicle is traveling, speed relative to a speed limit, and the like. After step 118, temperature information is acquired (step 120) and sent to the second terminal (step 122). Temperature information is gathered from a single point on the vehicle that is representative of the temperature of the air immediately surrounding the vehicle. In some embodiments, multiple temperature sensors are located throughout the vehicle and are coupled to the temperature module. The temperature module then calculates a representative temperature for the air surrounding the vehicle. A multiple sensor system, in many instances, reduces temperature fluctuations caused by direct exposure to sunlight or proximity to vehicle components that emit large amounts of heat, such as an engine or an exhaust system.

After step 122, skid control activity is checked (step 124). If the skid control is active, the skid control information is sent to the second terminal (step 126). Skid control information includes an identification of which wheels are skidding, a degree of skidding, and duration of a skid. If the skid control is not active, the system checks if the stability control is active (step 128). If the stability control is active, the stability control information is sent to the second terminal (step 130). Stability control information includes a difference between a driver's intended direction and a vehicle's actual direction, as well as actions taken by the stability control system to correct the difference. If the stability control is not active, the system checks if the ABS is active (step 132). If the ABS is active, the ABS information is sent to the second terminal (step 134). ABS information includes rotational speeds of each wheel, brake line pressure, and duration of ABS braking. In some embodiments, a single electronic stability control module is used to acquire the same or additional information related to stability, skid, and ABS conditions.

If the ABS is not active, the system checks if the vehicle's lights are active (step 136). If the vehicle's lights are active, lights information is sent to the second terminal (step 138). Lights information includes, among other things, information about headlights, fog lights, dome lights, signal lights, and brake lights. In some embodiments, the lights information also includes how long the lights have been active or what time the lights were activated. If the vehicle's lights are not active, the system checks if the vehicle's wipers are active (step 140). If the wipers are active, the wiper information is sent to the second terminal (step 142). The wiper information includes if the wipers are active, how fast the wipers are switching, and information from rain sensors that are coupled to the wipers and automatically adjust the speed of the wipers relative to the amount of precipitation incident upon the vehicle. If the wipers are not active, the system checks if the airbag(s) have deployed (step 144). If an airbag has deployed, information related to the airbag deploying is sent to the second terminal (step 146). Airbag information includes the time of deployment, which airbag deployed, and collision sensor information. If no airbag has deployed, the system again acquires location data (step 112). In other embodiments of the invention, information from each of the condition modules 62-78 is collected in the CPU and sent in batch form to the second terminal 30 or some information is sent in a batch form and other information is sent as individual messages.

Figure 4:
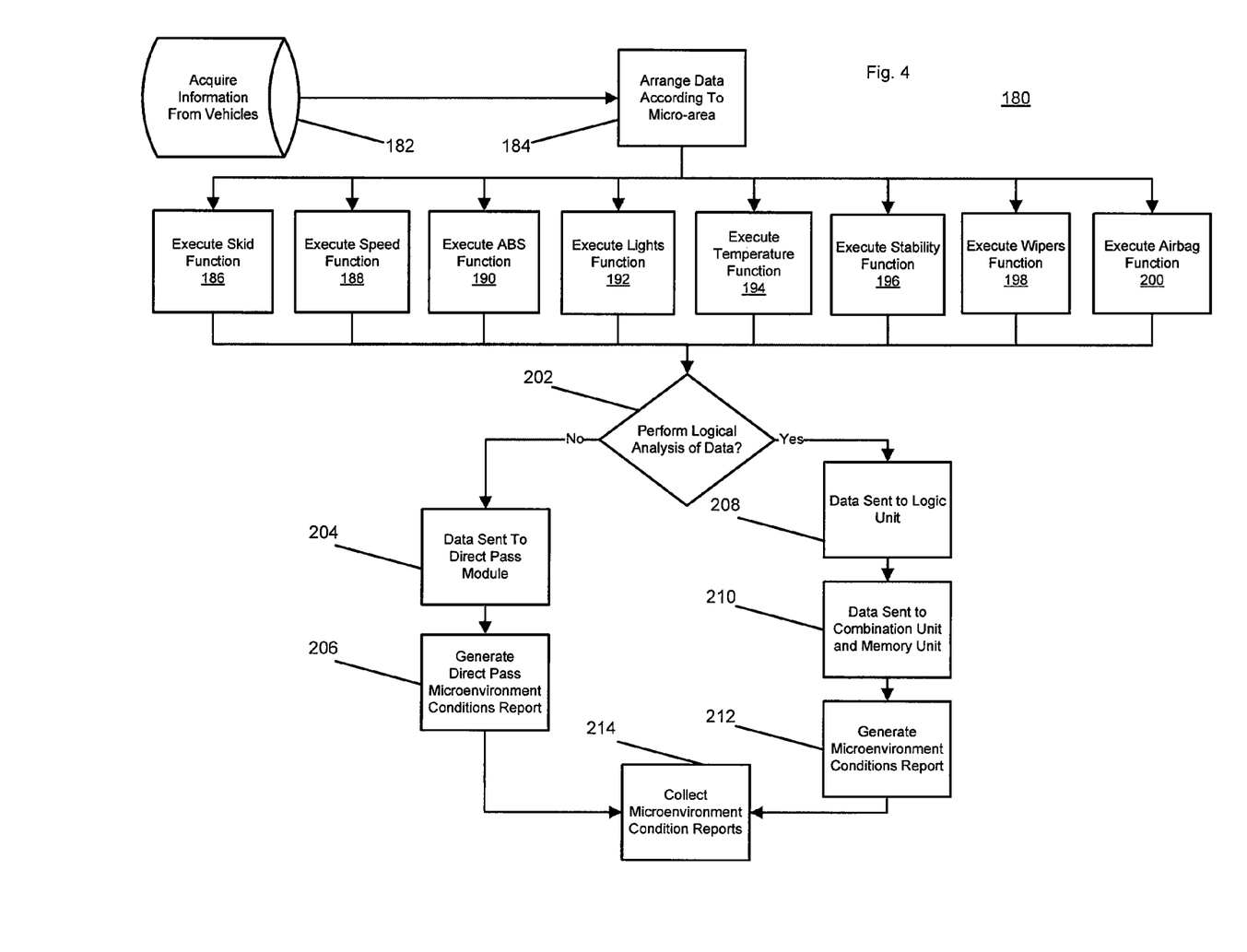
FIG. 4 illustrates an embodiment of a process for analyzing a set of condition data and generating a microenvironment condition report.

FIG. 4 illustrates an embodiment of a process 180 carried out by the second terminal 30 for generating microenvironment condition reports. After the second terminal 30 has received and collected the information from the plurality of vehicles (step 182), the information is arranged according to location data for each microarea (step 184). After step 184, the information for each microarea is evaluated in a set or correlation functions (steps 186-200). In the described embodiment, the correlation functions are evaluated in parallel. In other embodiments, the correlation functions are evaluated in series or a series-parallel combination.

After each correlation function has been evaluated, the second terminal 30 checks if a logical analysis is to be performed (step 202). The logical analysis is a customizable option that is configured based on an end user's preference. If no logical analysis is performed, the location data and the outputs of each of the correlation functions are sent to a direct pass module (step 204). The direct pass module generates a direct pass microenvironment condition report (step 206). If a logical analysis is performed, the location data and each output of the correlation functions are sent to a microenvironment logic unit (step 208). After step 208, the output of the microenvironment logic unit is sent to a microenvironment combination unit and a microenvironment memory unit (step 210). The microenvironment combination unit outputs a microenvironment condition report (step 212). After steps 206 and 212, the microenvironment condition reports for each microarea are collected before being sent to the end users (step 214). The subsystems of the second terminal 30 are described in more detail below.

Figure 5:
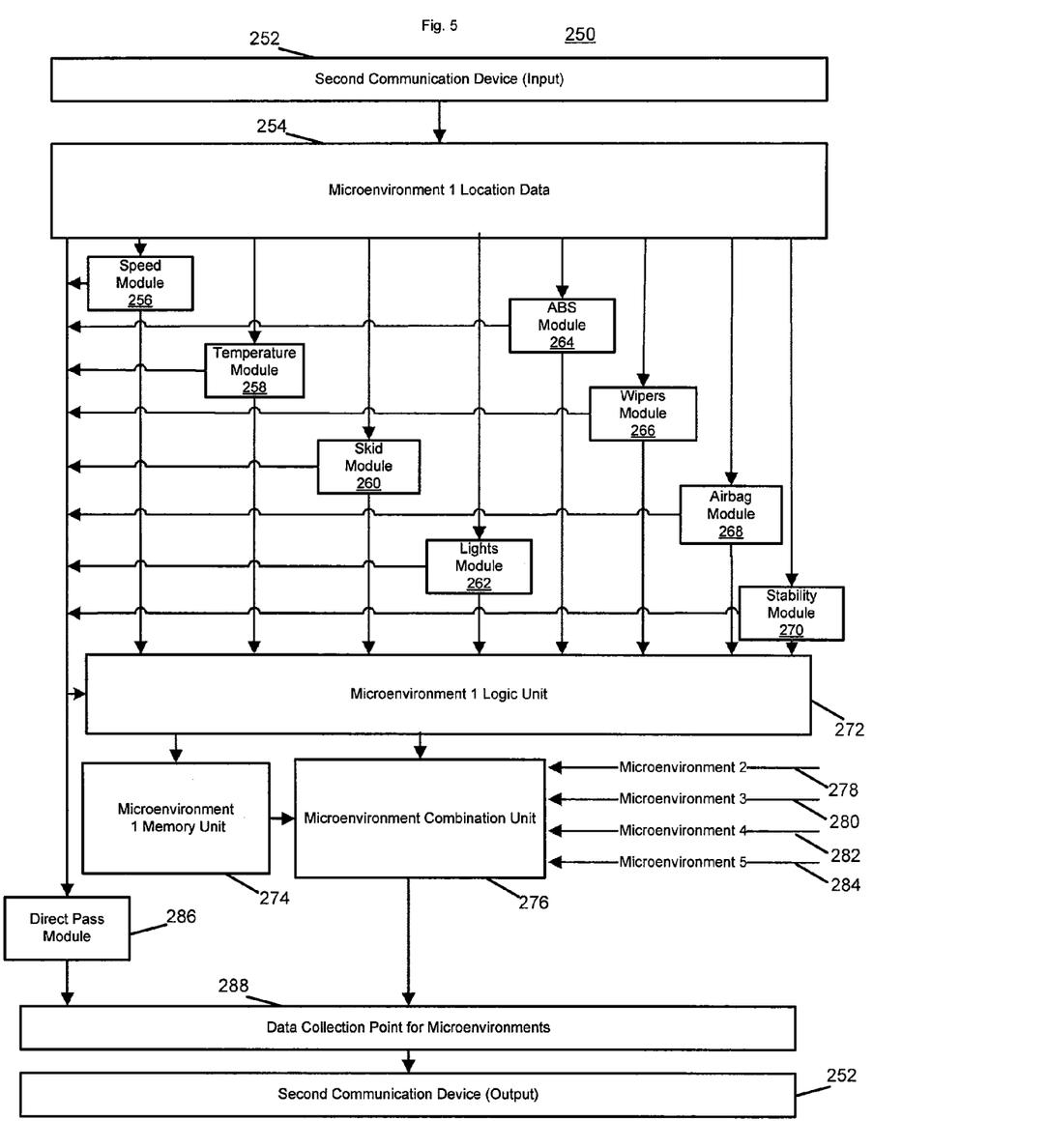
FIG. 5 illustrates an embodiment of a system for analyzing a set of condition data and generating a microenvironment condition report.

An embodiment of a system 250 for implementing process 180 from FIG. 4 is illustrated in FIG. 5. The second communications device 252 receives the information that was passed through the wide area network 50 from the first terminal 60. Information received at the second terminal 30 is stored in, for example, databases, servers, random access memory, and the like. The information is then arranged into a set of microareas based on the location data 254. The microareas are geographically small areas defined by, for example, geographic coordinates. In one embodiment, microareas are defined as a static size, such as the size of a city block. In other embodiments, microareas are of different or variable sizes.

A static microarea is defined based on a set of geographical coordinates. For example, a microarea is defined as a rectangular area and has a set of four geographical coordinates defining its corners. Then, as information is being arranged in the second terminal 30, vehicles 20 with location data that falls within the defined range for that microarea (e.g. any vehicles that have geographical coordinates within the bounded rectangular microarea) contributes to a set of microenvironment conditions for that microarea.

Figure 6:
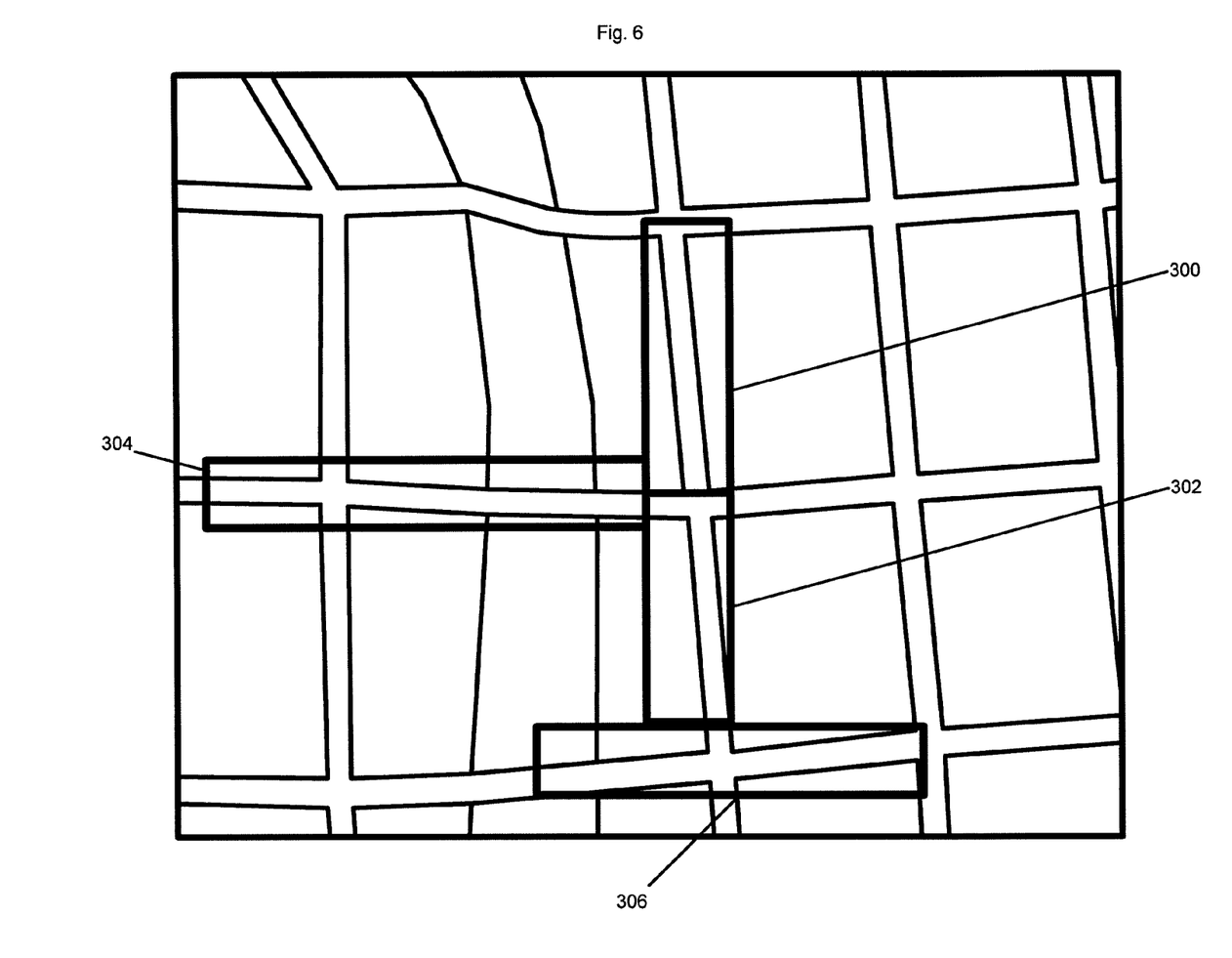
FIG. 6 illustrates an embodiment of a set of microareas defined by geographical location data.
Figure 7:
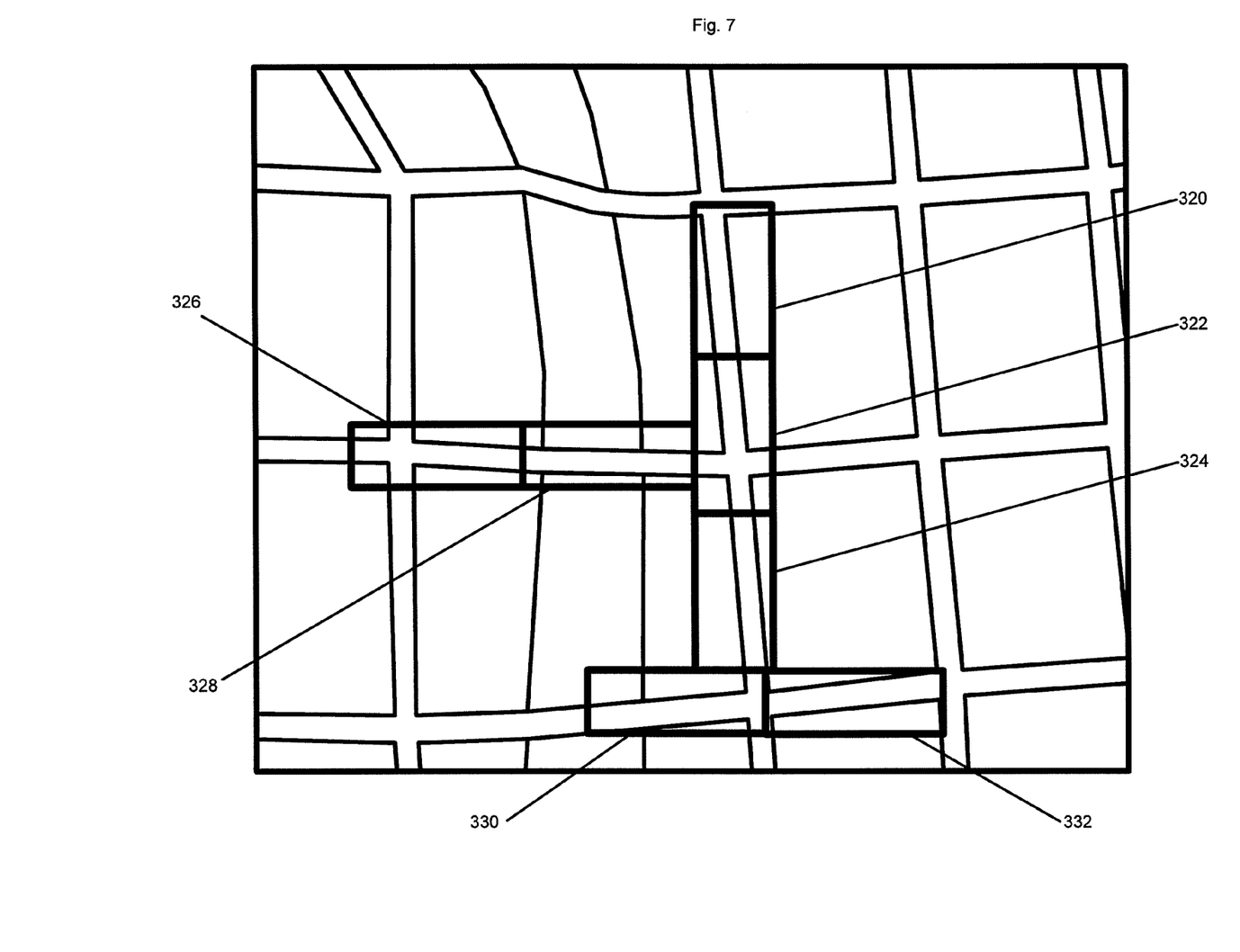
FIG. 7 illustrates an embodiment of a set of microareas defined by geographical location data and variable in size.

In some embodiments of the invention, microareas are variable in size based on factors that include, among other things, speed limit, traffic speed, traffic patterns, and time of day. FIG. 6 illustrates a first microarea 300, a second microarea 302, a third microarea 304, and a fourth microarea 306. The microareas are used to represent sections of city streets. The first microarea 300 and second microarea 302 are smaller than the third microarea 304 and the fourth microarea 306. FIG. 7 illustrates the same sections of city streets shown in FIG. 6. However, the sections of city streets that were previously represented by the first microarea 300, second microarea 302, third microarea 304, and fourth microarea 306, are now represented by a fifth microarea 320, sixth microarea 322, seventh microarea 324, eighth microarea 326, ninth microarea 328, tenth microarea 330, and eleventh microarea 332. As described above, a change in microarea size results from one or a combination of factors. In FIG. 7, potential causes for the microareas to become smaller in size include increased traffic volume or traffic speed. In some embodiments, microarea size is adjusted to maintain a relatively equal distribution of vehicle condition information for each microarea or allow for more detailed condition information for each microarea.

A speed limit variable microarea varies in size with respect to a posted speed limit. The size of the microarea, for example, is smaller for a section of road with a low speed limit (e.g. 25 mph) and larger for a section of road with a higher speed limit (e.g. 65 mph). The variability in microarea size compensates for the difference in the number of vehicles traveling within a static microarea when traveling at a high speed as compared to the number of vehicles traveling though the static microarea when traveling at a low speed. The larger microarea in higher speed areas allows for a more balanced distribution of vehicles in each microarea.

In another embodiment, the microarea size varies based on traffic patterns. A database of historical traffic data is used to determine microareas that routinely experience high traffic volumes and microareas that routinely experience low traffic volumes. Based on the information within the database, the size of the microareas is adjusted. The high traffic volume microareas are made smaller and the low traffic volume microareas are made larger. As a result, each microarea has a similar number of vehicles providing information to the second terminal 30.

In yet another embodiment, the microarea size is variable based on the time of day. For example, the traffic pattern data described above is used to determine the high traffic volume microareas and the low traffic volume microareas. Then, using the traffic pattern data with respect to time, the size of the microareas is modified. For example, some microareas have significantly increased traffic volumes in the morning and in the evening during rush hour. The size of the microarea is then modified during the day to compensate for variations in traffic volumes.

In other embodiments of the invention, the size of a first microarea is dynamically varied based on at least a second microarea adjacent to the first microarea. For example, a street is represented by five microareas. The information gathered from the first microarea indicates, for example, heavy traffic volume or slowed traffic. The second terminal 30 analyzes the information gathered from the four microareas immediately surrounding the first microarea. If during the analysis, the second terminal 30 recognizes that the first microarea and two of the adjacent microareas are experiencing heavy traffic volume or slowed traffic, the second terminal adjusts the size of the remaining two microareas representing the road to account for an anticipated change in traffic conditions.

In addition to adjusting microarea size, the second terminal 30 is also configured to execute a series of correlation functions for each microarea. Returning to FIG. 5, the correlation functions are executed in correlation modules 256-270. Each correlation module corresponds to a type of condition information. In one embodiment, the correlation modules include a speed module 256, a temperature module 258, a skid module 260, a lights module 262, an ABS module 264, a wipers module 266, an airbag module 268, and a stability module 270. Some embodiments include a subset of the above correlation modules and some embodiments include additional correlation modules.

Each correlation module's correlation function is designed to analyze an aggregate of information for a respective condition and output microenvironment condition. For example, in one embodiment, a speed correlation function determines whether the aggregate speed for the vehicles in a respective microarea is above or below a predetermined speed value. The predetermined speed value is based on values such as speed limit, minimum speeds, historical speed patterns, and the like. The second terminal 30 also determines a deviation from the predetermined speed. Each output of the speed correlation function then becomes a part of the microenvironment condition for speed.

A temperature correlation function determines values such as a microarea temperature and determines if the temperature within a microarea is below a predetermined temperature value. In some embodiments, the predetermined temperature value includes values such as the freezing point of water or expected high and low temperatures for a respective day. An average value for the temperature within a respective microarea is determined and then compared to the predetermined value. The temperature correlation function also determines a deviation from the expected temperature value.

A skid control correlation function determines whether a representative percentage of the vehicles in a respective microarea have active skid control systems. In some embodiments, if more than a quarter of the vehicles have active skid controls, then skid control is considered active for that microarea. In other embodiments, the percentage of vehicles within the microarea for identifying skid control as active varies with the size of the microarea and location data. For example, in locations such as road construction zones, which often require driving on loose impediments such as gravel or dirt and in hilly or mountainous areas with steep inclines, skid control is expected to be active.

A lights correlation function determines how many vehicles in a respective microarea have active lights. The lights include headlights, dome lights, fog lights, and the like. The percentage of vehicles with any of the above-mentioned lighting systems active is used later to make determinations about, among other things, fog, rain, and snow conditions. The percentage of vehicles needed for each situation is different. For example, in some embodiments, a higher percentage of vehicles are required to make a determination about fog than are required to make a determination about rain.

An ABS correlation function includes outputs related to the percentage of vehicles within a microarea that have active ABSs. The ABS correlation function also includes outputs related to average activity intervals for when the ABS is active. In other embodiments, the ABS correlation function has additional outputs.

In one embodiment, a wipers correlation function includes outputs related to the percentage of vehicles in a microarea that have wipers (front or rear) active. The wipers correlation function also includes an output related to an average value for how fast the wipers are switching directions and an output related to the rate at which precipitation is incident upon the vehicle. The rate information is determined from rain sensors coupled to the wipers that automatically adjust the speed of the wipers as the rate of precipitation incident upon the vehicle changes.

An airbag correlation function includes outputs that indicate the percentage of vehicles in a microarea that have deployed airbags, as well as outputs related to which airbags within the vehicles were deployed. In other embodiments, the airbag correlation function includes additional outputs.

A stability control correlation function includes outputs that indicate the percentage of vehicles in a microarea with active stability control systems. In some embodiments, the stability control correlation function also includes outputs related to average deviations between a driver's intended direction and a vehicle's actual direction. It also generates outputs related to the actions taken by the stability control system to correct the difference.

After evaluating each of the correlation functions, the outputs of each correlation function are combined into a set of microenvironment conditions and input into a microenvironment logic unit 272. The microenvironment logic unit 272 performs a logical analysis of the data contained in the set of microenvironment conditions. For example, in one embodiment, the microenvironment logic unit 272 is configured to determine traffic conditions, weather conditions, road conditions, traffic patterns, and the like. Traffic conditions include traffic jams, accidents, traffic volume, and the like. Weather conditions include rain, sleet, snow, temperature, humidity, and the like. Road conditions include slippery roads, icy roads, loose pavement, rough or uneven terrain, and the like. Traffic patterns include traffic volume (light, moderate, heavy) and direction, increased speed, decreased speed, and the like. In other embodiments, more or fewer conditions are determined in the microenvironment logic unit 272.

In some embodiments, the microenvironment logic unit 272 is configured to determine the individual conditions described above. In other embodiments, the microenvironment logic unit 272 is configured to determine combinations of the conditions described above. For example, the microenvironment logic unit 272 determines road conditions based on a combination of several individual conditions. For a respective microarea, the microenvironment logic unit 272 analyzes speed conditions, temperature conditions, wiper conditions, and traction conditions. Based on these conditions, the microenvironment logic unit 272 determines a robust description for the road conditions. For example, the microenvironment logic unit 272 determines that the temperature is below freezing, vehicle speeds have slowed, traction and skid controls are active, wipers are active, and, therefore, the road is icy and snowy. The microenvironment logic unit 272 is discussed in greater detail below.

A microenvironment memory unit 274 includes a memory cache, random access memory, a mass storage device, or any combination thereof. The microenvironment memory unit is configured to receive a first set of microenvironment conditions from the microenvironment logic unit 272. The first set of microenvironment conditions is stored in, for example, a stack or a queue. After the microenvironment logic unit 272 determines a second (subsequent) set of microenvironment conditions, the microenvironment memory unit 274 receives the second set of microenvironment conditions. The microenvironment memory unit 274 receives sets of microenvironment conditions until its memory is full. At that point, the oldest sets of microenvironment conditions are overwritten or discarded to clear room for new sets of microenvironment conditions. In some embodiments, the microenvironment memory unit 274 is configured to hold a predetermined number of sets of microenvironment conditions, such as, for example, the three most recent sets of microenvironment conditions. The microenvironment memory unit 274 provides the sets of microenvironment conditions to a microenvironment combination unit 276 described below. In additional embodiments, the microenvironment memory unit 274 is a database or server and stores each set of microenvironment conditions.

The microenvironment combination unit 276 generates a microenvironment condition report. In one embodiment, the microenvironment combination unit 276 combines a first set of microenvironment conditions from a respective microenvironment, the sets of microenvironment conditions from the microenvironment memory unit 274, and at least a second set of microenvironment conditions from a second microarea adjacent to the first microarea. In one embodiment, the microenvironment combination unit 276 receives an additional set of microenvironment conditions from each of four adjacent microareas 278-284. Based on each set of microenvironment conditions, the microenvironment combination unit 276 checks for inconsistent data. For example, if a first microarea indicates an average temperature of 72° F. and a second microarea directly adjacent to the first indicates an average temperature of 35° F., the microenvironment combination unit examines the remaining data sets to determine which set of data is erroneous. After a determination has been made with regard to which data set is valid, the invalid data set or a portion of the invalid data set is discarded (or ignored). The microenvironment combination unit also makes predictions in a similar manner as described above with respect to dynamically varying the size of a microarea.

The microenvironment combination unit 276 is configured to analyze each of the sets of microenvironment conditions to generate the microenvironment condition report. The microenvironment condition report includes information such as raw sets of microenvironment conditions from each microarea, information consistency checks among combinations of sets of microenvironment conditions, and predictions about conditions that each microenvironment is likely to encounter. The predictions include, among other things, traffic predictions, weather predictions, road condition predictions, traffic pattern predictions, and the like.

The microenvironment condition report is also customizable to a type of information the end user requests. In one embodiment, the end user is a weather service. The weather service's microenvironment condition report includes, among other things, a set of weather condition conclusions related to each microenvironment. The weather condition conclusions include a highly detailed temperature map for each microenvironment, conclusions related to whether it is raining or snowing, rates at which rain and snow are falling, and conclusions related to the movement of a weather system. In other embodiments, end users include a department of transportation, a news station, and subscription-based GPS service providers.

The second terminal 30 also includes a direct pass module 286. The direct pass module 286 bypasses the microenvironment logic unit 272, the microenvironment memory unit 274, and the microenvironment combination unit 276. The direct pass module 286 receives raw location data and the outputs of each of the correlation modules described above. Similar to the microenvironment combination unit 276, the direct pass module 286 outputs a direct pass microenvironment condition report with data from the correlation functions organized according to micro-area. The data is then passed on to the end users.

The microenvironment condition report and the direct pass microenvironment condition reports are each sent to a collection point 288. The collection point 288 collects the microenvironment condition reports for each microarea and prepares them to be sent to the end users. The collection point prepares the data for transmission by the second communication device 252. The data is sent through the wide area network 50 by the second communication device 252 in a continuous stream of individual reports or in a batch form.

The microenvironment logic unit 272 described with respect to FIG. 5 performs a series of logic tests to determine a variety of conditions related to a microarea, such as traffic conditions, weather conditions, road conditions, traffic patterns, and the like. In the description that follows, the logic tests are described, in a short-hand manner, as producing results. However, it should be understood that conducting the logic tests may result in certain assumptions being made. For example, for purposes of brevity the "result" of a test may be described as being an "accident," but it is not intended to indicate that the test was faulty or the result of randomness. Instead, it is intended that that a logic test was performed based upon the existence of certain conditions, and that the programmed or otherwise constructed logic assumes that a vehicle accident has occurred within the microarea being monitored or analyzed based on the test performed. Thus, the description should be read with the understanding that a short-hand description is provided in some instances.

Figure 8:
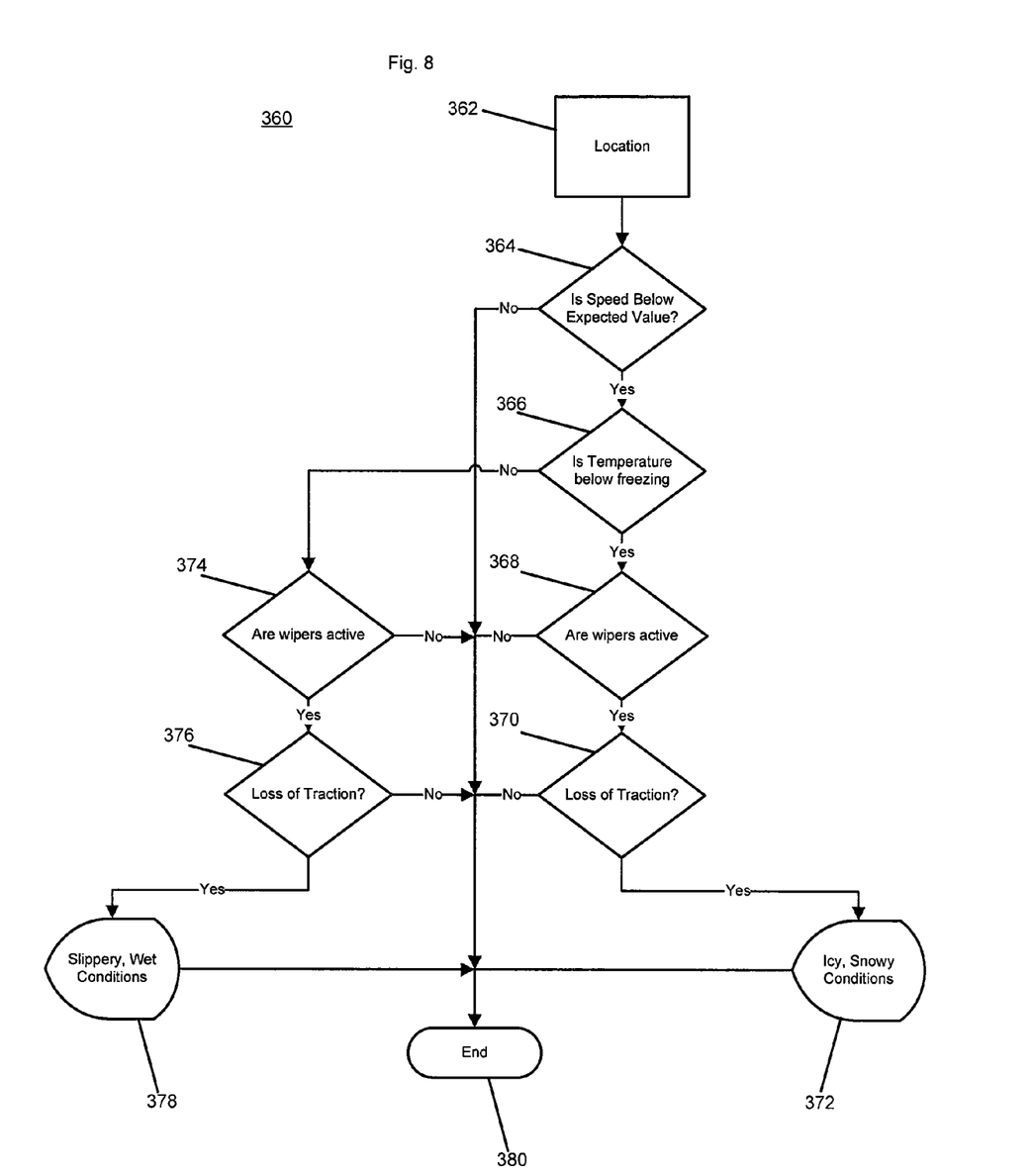
FIG. 8 illustrates an embodiment of a logic test for determining a set of road conditions.

An example of a logic test that the microenvironment logic unit 272 performs in embodiments of the invention is shown in FIG. 8. The process 360 is used to determine whether road conditions are icy and snowy or only slippery and wet. The process 360 begins with acquiring location data (step 362). Since the microenvironment logic unit 272 uses the outputs of the correlation functions to perform the logic tests, each logic test is performed with respect to a given microarea. Therefore, in some embodiments of the invention, location data is not necessary during the logic tests. After step 362, the output of the speed correlation function is checked (step 364). As described above, the output of each correlation function represents a conclusion about the aggregate of vehicles within a respective microarea. In the described embodiment, the microenvironment logic unit 272 is checking whether the output of the speed correlation function is below an expected value, such as a speed limit. If the speed for the microarea is not below the expected value, the logic test ends (step 380).

If the speed is below the expected value, the process proceeds to step 366 to check if the temperature is below freezing. If the temperature is below freezing, the microenvironment logic unit checks if the wipers are active (step 368). If the wipers are not active, the process 360 ends (step 380). If the wipers are active, the microenvironment logic unit 272 tests whether the vehicles are experiencing a loss of traction (step 370). If the vehicles are experiencing a loss of traction, the result of the logic test is that the roads are icy and snowy (step 372). If the vehicles are not experiencing a loss in traction, the logic test ends (step 380). If the temperature is not below freezing, the microenvironment logic unit 272 checks if the wipers are active (step 374). If the wipers are not active, the logic test ends (step 380). If the wipers are active, the microenvironment logic unit 272 checks if the vehicles are experiencing a loss of traction (step 376). If the vehicles are experiencing a loss of traction, the result of the logic test is that the roads are wet and slippery (step 378). If the vehicles are not experiencing a loss in traction, the logic test ends (step 380). In other embodiments, intermediate determinations are made within each logic test to reduce the total number of logic tests that are performed.

Another logic test is used to determine traffic conditions. As described above with respect to FIG. 8, the process 400, illustrated in FIG. 9, begins with data being organized by location (step 402). The next step in the process 400 is to check if an airbag has deployed (step 404). If an airbag has deployed, the microenvironment logic unit 272 checks if the speed is below an expected value (step 406). If the aggregate speed is not below an expected value, the result of the logic test is an accident (step 408). If the speed is below an expected value, the ABS is checked for activity (step 410). If the ABS is not active, the result of the logic test is traffic congestion due to an accident (step 412). If the ABS is active, the result of the logic test is an accident and a traffic jam (step 418). If the ABS is active, the system checks the stability control and the skid control (steps 414 and 416). Both stability control and skid control are used as indicators of the severity of an accident or traffic jam. If the stability control and skid control are not active, the logic test determines that there has been an accident and that there is also a traffic jam (step 418). If the stability control and skid control are active, a severity level of the accident and the traffic jam is increased. Additionally, in some embodiments, the number of airbags deployed within the same microarea increases an accident severity level.

Figure 9:
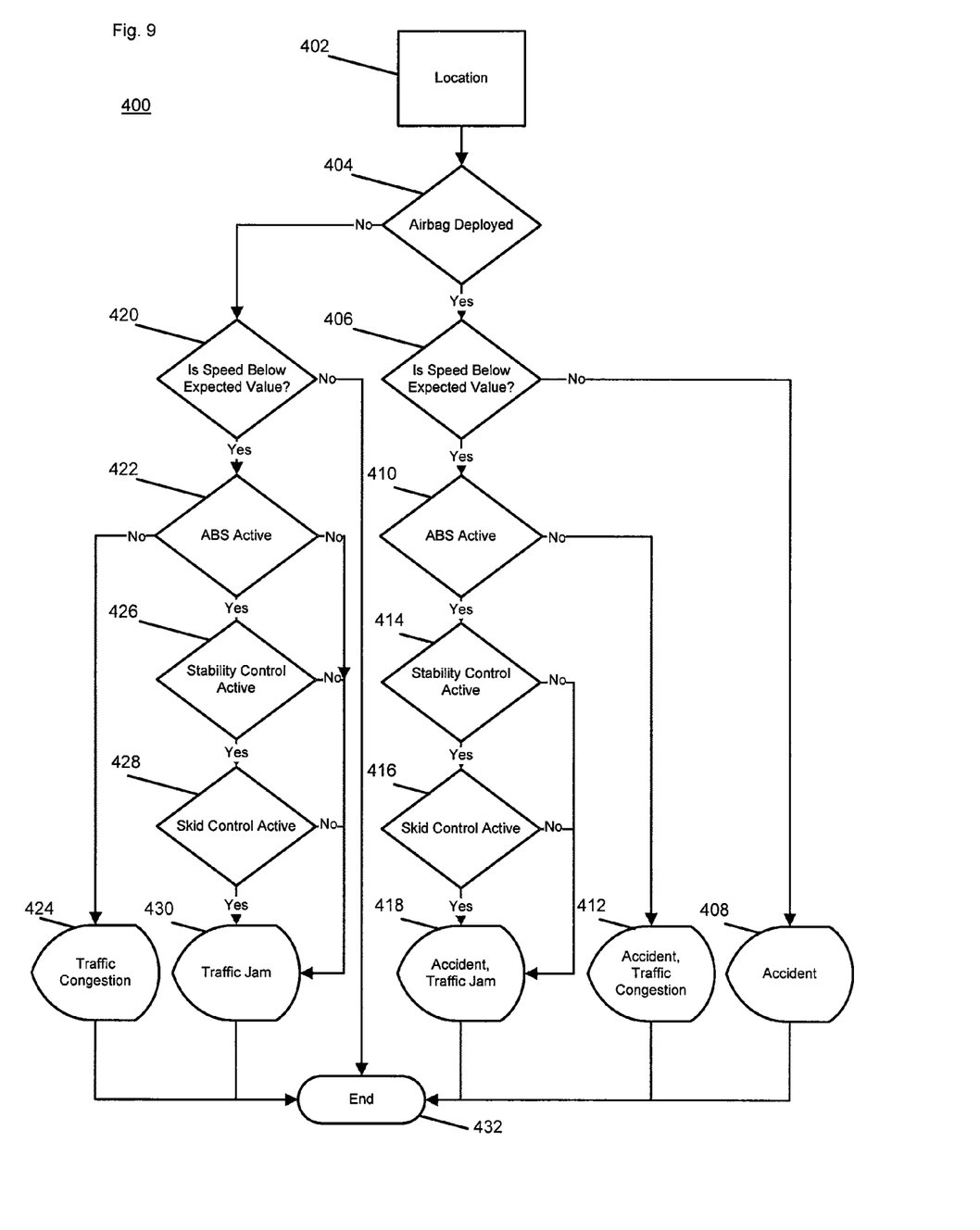
FIG. 9 illustrates an embodiment of a logic test for determining a set of traffic conditions.

If no airbags deployed, the microenvironment logic unit 272 checks if the speed is below an expected value (step 420). If the speed is not below an expected value, the logic test ends (step 432). If the speed is below an expected value, the ABS is checked (step 422). If the ABS is not active, the result of the logic test is traffic congestion (step 424). If the ABS is active, the result of the logic test is a traffic jam (step 430). As described above, factors such as stability control and skid control assist in indicating the severity of a traffic jam (steps 426 and 428). If the ABS, stability control, and skid control are active, the severity of the traffic jam is greater than if only the ABS is active. In other embodiments, additional intermediate determinations are made to reduce the number of logic tests performed. Additional conditions are also evaluated in each logic test.

Additional logic tests related to traffic conditions, weather conditions, road conditions, traffic patterns, and the like are implemented in other embodiments of the invention.

In additional embodiments of the invention, the microenvironment condition reports from a plurality of microareas are combined to provide information for a macroarea. The highly detailed microenvironment condition reports are combined to generate a macroenvironment condition report. No information is discarded during combination. Therefore, the macroenvironment condition report provides a comprehensive view of a region. An end user, in some embodiments, initially views information from a macroarea level and is able to "zoom in" on particular microareas of interest. The macroenvironment condition reports allow end users such as a weather service to track temperatures with a very high degree of accuracy over a large area or to track a weather system as it moves through a region. Similar macroarea level views are available to other end users to track, observe, and monitor additional conditions.

Thus, the invention provides, among other things, a system for generating a microenvironment condition report based on vehicle condition information from a plurality of vehicles. Various features and advantages of the invention are set forth in the following claims.

What is claimed is:

1. A system for determining a microenvironment, the system comprising:
   a first plurality of monitoring devices located in a first vehicle, each of the first plurality of monitoring devices configured to monitor at least one condition among a plurality of vehicle conditions of the first vehicle, the conditions including a vehicle location and a vehicle speed;
   a first terminal coupled to the first vehicle and configured to collect a first set of condition information related to the plurality of conditions of the first vehicle;
   a first communication device connected to the first terminal and configured to transmit the first set of condition information through a wide area network;
   a second plurality of monitoring devices located in a second vehicle, each of the second plurality of monitoring devices configured to monitor at least one condition among a plurality of vehicle conditions of the second vehicle;
   a second terminal coupled to the wide area network and configured to receive the first set of condition information and a second set of condition information, the second terminal further configured to
      arrange the first set of condition information and the second set of condition information based on a set of microareas, each microarea including a two-dimensional area defined by a set of geographical coordinates,
      use the first and second sets of condition information to create a set of microarea condition information for a first microarea,
      evaluate a correlation function related to at least one respective condition in the set of microarea condition information to determine a first set of microenvironment conditions for the first microarea,
      determine a validity of the first set of microenvironment conditions based on a comparison of the first set of microenvironment conditions with a second set of microenvironment conditions from a microarea that is adjacent to the first microarea, and
      analyze the first set of microenvironment conditions for the first microarea, at least a second set of microenvironment conditions from at least one microarea adjacent to the first microarea, and a previous set of microenvironment conditions of the first microarea to generate a first microenvironment condition report and a future microenvironment condition report; and
   a second communication device coupled to the second terminal and configured to pass the first microenvironment condition report to a plurality of users.

2. The system of claim 1, wherein the plurality of vehicle conditions includes a temperature outside a vehicle.

3. The system of claim 1, wherein the plurality of vehicle conditions includes a status of a skid control system.

4. The system of claim 1, wherein the plurality of vehicle conditions includes a status of a vehicle stability control system.

5. The system of claim 1, wherein the plurality of vehicle conditions includes a status of a vehicle anti-lock brake system.

6. The system of claim 1, wherein the plurality of vehicle conditions includes a status of a vehicle's lights.

7. The system of claim 1, wherein the plurality of vehicle conditions includes a status of a vehicle's wipers.

8. The system of claim 1, wherein the plurality of vehicle conditions includes a status of a vehicle's airbag system.

9. The system of claim 1, wherein the first microenvironment condition report includes a plurality of weather condition conclusions.

10. The system of claim 1, wherein the first microenvironment condition report includes a plurality of traffic condition conclusions.

11. The system of claim 1, wherein the first microenvironment condition report includes a plurality of road condition conclusions.

12. The system of claim 1, wherein the first microenvironment condition report includes a plurality of traffic pattern conclusions.

13. The system of claim 1, wherein the microareas are of different sizes.

14. The system of claim 1, wherein the microareas are dynamically variable in size.

15. The system of claim 14, wherein the size of the microareas dynamically varies based on the number of vehicles in a respective microarea and the microareas adjacent to the respective microarea.

16. The system of claim 1, wherein the first microenvironment condition report is customizable for each respective user.

17. The system of claim 1, wherein the wide area network is a cellular network.

18. A method for determining a microenvironment, comprising:
- monitoring a first set of conditions of a first vehicle, the first set of conditions including a vehicle location and a vehicle speed;
- coupling a first terminal to the first vehicle, the first terminal configured to collect a first set of condition information related to the first set of conditions;
- connecting a first communication device to the first terminal;
- transmitting the first set of condition information through a wide area network;
- monitoring a second set of conditions of a second vehicle, the second set of conditions including a second vehicle location and a second vehicle speed;
- connecting a second terminal to the wide area network;
- configuring the second terminal to receive the first set of condition information and a second set of condition information;
- arranging the first set of condition information and the second set of condition information based on a set of microareas, each microarea including a two-dimensional area defined by a set geographical coordinates,
- using the first and second sets of condition information to create a first set of microarea condition information for a first microarea;
- evaluating a correlation function related to at least one respective condition in the first set of microarea condition information;
- determining a first set of microenvironment conditions for the first microarea;
- determining a validity of the first set of microenvironment conditions based on a comparison of the first set of microenvironment conditions with a second set of microenvironment conditions from a microarea that is adjacent to the first microarea;
- analyzing the first set of microenvironment conditions for the first microarea, at least a second set of microenvironment conditions from at least one microarea adjacent to the first microarea, and a previous set of microenvironment conditions of the first microarea to generate a first microenvironment condition report;
- combining the first microenvironment condition report and at least a second microenvironment condition report to generate a macroenvironment condition report;
- coupling a second communication device to the second terminal; and
- configuring the second communication device to pass the first microenvironment condition report to a plurality of users.

19. The system of claim 18, wherein generating the first microenvironment condition report includes generating a plurality of weather condition conclusions.

20. The system of claim 18, wherein generating the first microenvironment condition report includes generating a plurality of traffic condition conclusions.

21. The system of claim 18, wherein generating the first microenvironment condition report includes generating a plurality of road condition conclusions.

22. The system of claim 18, wherein generating the first microenvironment condition report includes generating a plurality of traffic pattern conclusions.

* * * * *

UNITED STATES PATENT AND TRADEMARK OFFICE
CERTIFICATE OF CORRECTION

| | | |
|---|---|---|
| PATENT NO. | : 8,180,518 B2 | |
| APPLICATION NO. | : 12/103481 | |
| DATED | : May 15, 2012 | |
| INVENTOR(S) | : Dennis M. Petricoin, Jr. | |

It is certified that error appears in the above-identified patent and that said Letters Patent is hereby corrected as shown below:

Col. 13, line 11, Claim 15:

change "The system of claim 14" to --The system of claim 1--

Signed and Sealed this
Twenty-fourth Day of July, 2012

David J. Kappos
*Director of the United States Patent and Trademark Office*